United States Patent [19]

Reuting

[11] 3,999,107
[45] Dec. 21, 1976

[54] SELF-STARTING SYNCHRONOUS MOTOR

[75] Inventor: Hans-Werner Reuting, Peine, Germany

[73] Assignee: ELMEG Elektro-Mechanik GmbH, Peine, Germany

[22] Filed: June 16, 1975

[21] Appl. No.: 587,130

[30] Foreign Application Priority Data
June 20, 1974 Germany .......................... 2429492

[52] U.S. Cl. .................. 318/135; 310/12; 310/181; 310/162; 310/154; 310/41; 340/378 MW

[51] Int. Cl.² .......................................... H02K 41/02

[58] Field of Search .............................. 310/12–14, 310/49, 181, 162–165, 168, 155, 30, 41; 318/135, 696, 685, 130; 340/378 MW

[56] References Cited
UNITED STATES PATENTS

| | | |
|---|---|---|
| 2,040,763 | 5/1936 | Summers ...................... 318/130 X |
| 2,568,757 | 9/1951 | Mesh ................................... 310/30 |
| 3,204,136 | 8/1965 | Kaiwa et al. .................. 318/696 X |
| 3,453,510 | 7/1969 | Kreuter et al. .................. 310/14 X |
| 3,482,126 | 12/1969 | Bradley ............................ 310/49 |
| 3,859,547 | 1/1975 | Massie ................................ 310/14 |

Primary Examiner—Donovan F. Duggan
Attorney, Agent, or Firm—Ralf H. Siegemund

[57] ABSTRACT

An electro-magnetic synchronous motor has an E-shaped stator linear or partially wrapped around an axis, the legs being the pole shoes. The middle leg includes a permanent magnet and one or both outer legs have coils. A movable displacement element has poles spaced further apart than the stator poles. The movable element has a stable position for zero energization in which one of its poles aligns with the stator pole having the permanent magnet. Coil energization disturbs magnetic field symmetry to move the element always in the right direction.

20 Claims, 14 Drawing Figures

SELF-STARTING SYNCHRONOUS MOTOR

BACKGROUND OF THE INVENTION

The present invention relates to an electric motor of the linear or the rotary variety, in which the movable element moves in synchronism with energizing pulses applied to the stator element.

The invention arose pursuant to a development of an electromagnetic actuation mechanism for pulse counters having digit or cipher rolls. Such pulse counter actuators are usually driven by electromagnetically operated ratchet type devices, which have various drawbacks, among them being wear and unreliability. Step motors are also used occasionally, but they are often quite large. Also, the various known devices usually have mechanical locks to prevent the cipher rolls from turning back inadvertently. A step motor is known, for example, through German printed patent application OS 2,103,227. That motor is rather large. It has a permanent magnetic bias, which requires a much larger electromagnetic field to obtain a true rotational motion of the rotor rather than mere oscillations. Also, that rotor could start in the wrong direction.

DESCRIPTION OF THE INVENTION

It is an object of the present invention to provide a new and improved motor, which will run in strict synchronism with a train of pulses, so that, for example, a single pulse produces a definite displacement step. The invention will find preferred utility in pulse counters, but has wider and more general uses.

In accordance with the preferred embodiment of the present invention, it is suggested to provide a stator with at least three pole shoes, one of which, preferably the middle one, being permanent-magnetically biased and a divided return flux and bias runs through the other two pole shoes. The motor has also a displacement or movable element (linear or rotational) having at least two poles to complete the return flux paths, whereby for (otherwise) unenergized stator one pole of the movable element faces the permanent-magnetically biased pole of the stator and the other stator poles balance the position of the movable element through oppositely equal acting forces. The stator carries at least one coil, which, when energized, disturbs the balanced flux in the return paths to obtain one step for one energizing pulse, whereby one step can be defined as a displacement, so that the next pole of the displacement element is caused to align with the permanent magnetically biased stator pole. The energization pulse must at least (but needs only to) provide for active movement of the displacement element by half a pole distance thereof, because position balancing takes over beyond such displacement to complete the step. The rate of de-energization thereafter depends on the inertia of the movable element, as it should not overshoot.

The pulses may be of rectangular contour or half waves of an a.c. supply. One may use here rectification and/or pulse shaping. Signal shaping includes here use of parallel capacitors and adjustable resistors. The pole spacing of stator should be smaller than the spacing for the poles of the displaceable element. The latter poles should be of equal width, while the stator poles are of dissimilar width in that the permanent-magnetically biased one is wider than the others, preferably twice as wide, and the edge-to-edge spacing of the stator poles is about the same as the smaller pole width. This way one obtains a system which actively maintains its equilibrium in that any deflection causes correctly oriented restoring forces, while electromagnetically disturbing of the symmetry of the balancing forces establishes a definite direction of displacement when desired.

Using one coil on the one stator pole permits ready energization for moving the displacement element in one or the other direction. A second coil on the other stator pole permits separate energization for oppositely directed displacement. Connecting the two coils in series permits reversal of the direction of movement through reversal of polarity, while for any pulse both coils disturb the equilibrium establishing bias in the same direction as to displacement of the movable element. Separate coils are more suitable if the forward and reverse moving pulses come from different sources. Sense of winding and direction of energizing current flow can be matched in either case to obtain the correct direction of movement.

The permanent-magnetic energization of the one stator pole could result from permanent energization of the pole through a d.c. operated coil. It is, however, preferred to use a permanent magnet and include it structurally in the pole shoe. One provides here preferably a magnetic shunt path with air gap to void demagnetization (or even reverse magnetization) of the permanent magnet by excessive magnetizing signals in the stator coil or coils. The shunt is also instrumental in reducing the power requirement for operating the motor, (see also application corresponding to German application P 23 65 190.3-33).

Whenever the coil or coils unbalance the magnet bias, this unbalancing is not just effective in the two (outer) stator poles, but the flux concentration in the central pole is enforced on that side, which is closest to one of the poles of the movable element after the element has left already the equilibrium position. This concentration of flux is beneficial and should occur for each of the two directions of possible motion. Thus, the magnetic conductivity in that pole shoe should be quite uniform.

As stated, the movable element can be of the linear variety having rack-like contour. Alternatively, the movable element can be a rotor having contour of a wrap-around rack or of a flattened cylinder with but two poles and cylindrical pole shoe faces. If the movable element is a rotor it may directly be coupled to or combined with a digit roll of a counter without interpositioning of transmission gearing or the like.

Instead of a single stator, one could use two of them, which are displaced transversely to both, the direction of movement and the stator displacement element spacing. This is of particular advantage for a motor of the rotary variety, wherein each stator has contour of a ¾ wrap-around E with 180° off-set.

DESCRIPTION OF THE DRAWINGS

While the specification concludes with claims particularly pointing out and distinctly claiming the subject matter, which is regarded as the invention, it is believed that the invention, the objects and features of the invention and further objects, features and advantages thereof will be better understood from the following description taken in connection with the accompanying drawings in which:

FIGS. 1a through 1d show progressive positions of the displacement element;

Proceeding now to the detailed description of the drawings, FIG. 1 illustrates schematically portions of the novel motor which could be interpreted as a rotary or a linear motor. The magnetic system includes a stator body 7 having representatively three pole shoes 2, 3, and 4. More could be provided, but are not needed. The outer two pole shoes 2 and 4 respectively carry energizing coils 5 and 6. The central pole shoe 3 has a permanent magnet 1. The body proper of stator 7 interconnects the pole shoes physically as well as magnetically. Moreover, the pole shoe width of central pole shoe 3 is twice the width of pole shoes 2 and 4, and the edge-to-edge spacing between central and outer pole shoes is about the same as the width of the two outer poles 2, 4.

The movable element 8 underneath the stator 7 may be of rack-like construction for a linear motor or its illustration could be interpreted as the development of a rotor. The element 8 is shown in FIG. 1 in a particular position. FIGS. 1a through 1d show that same element 8, but in different progressive positions, particularly with reference to the stator y of FIG. 1 and as far as vertical alignment of the Figures is concerned.

Figure 1:
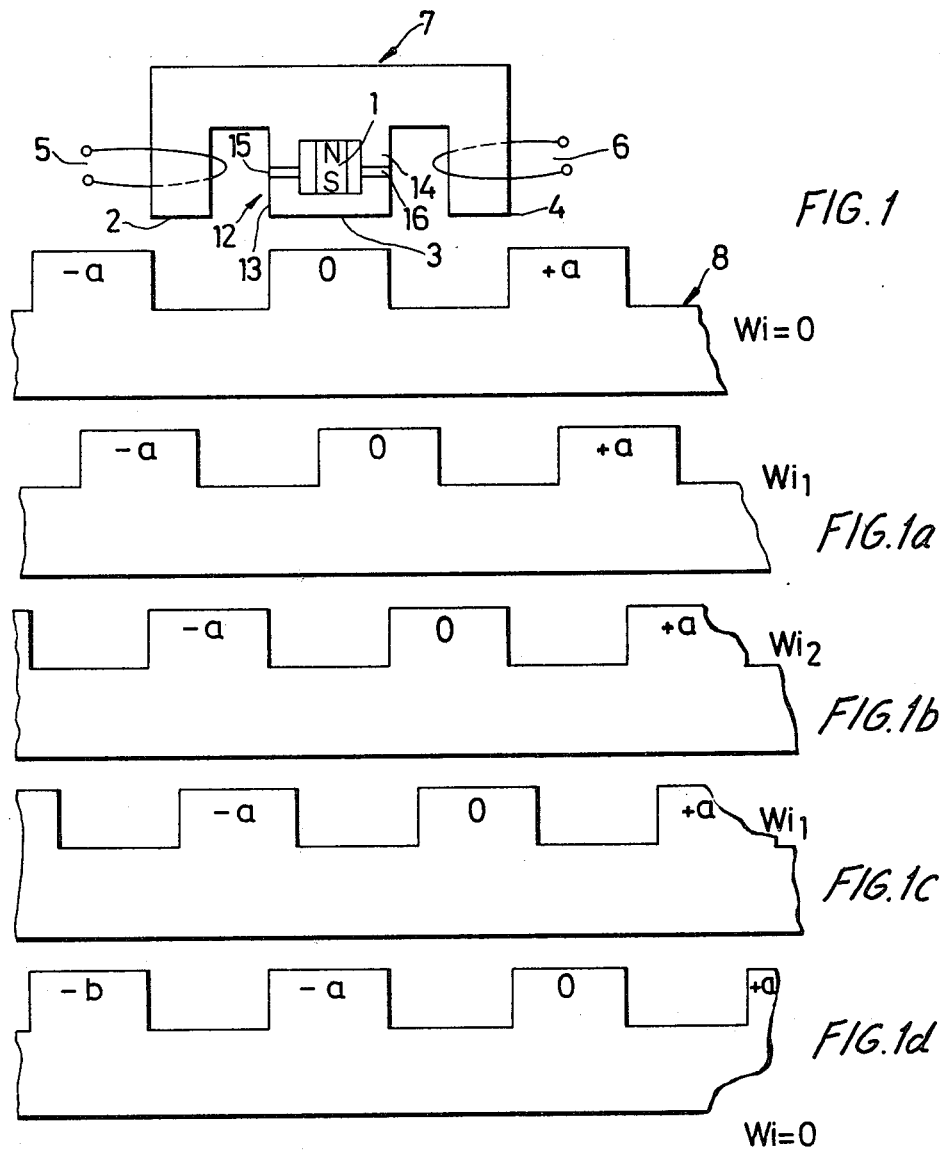
FIG. 1 is a schematic illustration of the relation between the stator and the displacement element of a motor in accordance with the preferred embodiment of the invention.

Element 8 has individual, similar pole shoes identified by letters O, +a, −a, −b, etc., whereby arbitrarily the particular pole shoe of element 8, which is aligned in FIG. 1 with center pole 3 is denoted by character O and the other pole shoes are referenced thereto by the letter and sign notation. The figure is, of course, a schematic illustration only; however, the particular relations illustrated are quite an accurate representation of the pole-shoe relation if e.g. pole O of element 8 is positioned exactly opposite the central stator pole, poles +a and −a just about clear respectively poles 2 and 4 of the stator 7.

Please note that there is no principal necessity of a one-to-one relation in the number of stator poles and the number of poles of the element 8. The latter may have many more (see e.g. FIG. 9) or less, but at least two (FIG. 10).

At first we shall consider the effect coil 6 on stator pole shoe 4 has on the element 8. If energizing current does not flow through the coil (energization level Wi = O, FIG. 1), permanent magnet 1 is the sole source for magnetic energization, and any magnetic interaction with the movable element 8 is attributable to that bias. The magnetic flux is symmetrical, i.e., it is distributed from magnet 1 in equal portions into pole shoes 2 and 4. The left-hand pole shoe 2 exerts a force upon pole −a of element 8, which tends to move that element to the right (positive), because that element tends to attract pole −a. An oppositely directed (negative) force, but of the same magnitude is exerted by pole 4 upon pole +a. Thus, these two forces balance and compensate each other. No force in the direction of permissible movement is exerted by pole 3 upon pole O. As a consequence, movable element 8 is maintained in the position shown in FIG. 1, which is the equilibrium position for unenergized stator accordingly.

Figure 2:
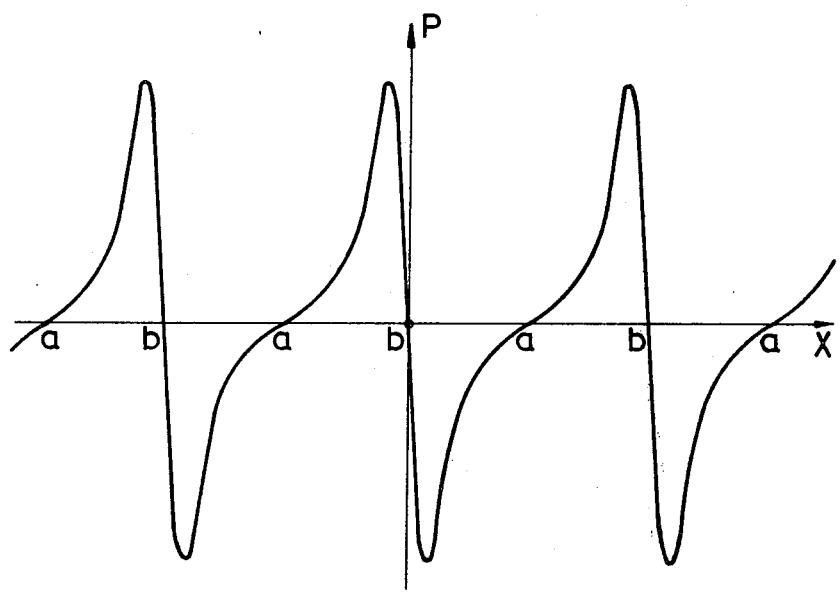
FIG. 2 is a restoring force vs. displacement diagram.

The equilibrium is dynamically maintained quite accurately. Assuming element 8 were displaced for any reason to the right, rather strong restoring forces are set up as the symmetry of forces acting on element 8 is distributed. FIG. 2 shows the restoring forces plotted along the abszissa and against displacement $x$, whose origin is arbitrarily selected to be the position of element 8 in FIG. 1.

It can readily be seen that the restoring forces rise rapidly for even small deflections $x$ from the equilibrium position. The maximum restoring force is obtained for a displacement $x$ not quite equal to the (smallest) air gap between the poles of stator 7 and element 8.

Since the friction forces tending to retard movement of element 8 are much smaller than the effective magnetic forces, particularly the maximum force thereof the stabil position is, in fact, actively maintained with small tolerances due to the steep rise of the effective forces for even small displacement values $x$. Specifically, tolerance range of accurate positioning is much smaller than the air gap across stator 7 - element 8.

Assuming that the air gap between poles 3 and O is about 0.1 to 0.3 mm, one can readily obtain an accuracy of less than ± 0.1 mm in the positioning of element 8. That, in turn, determines the accuracy for the device, e.g., a cipher roll that is to be positioned by element 8. Such an accuracy is particularly desirable, if the digit or cipher roll participates also in a print out.

As can be seen further from FIG. 2, if element 8 is moved for a large distance (we still consider only displacements, not induced by energization of any of the coils) element 8 may move into positions beyond the effectiveness of maximum restoration force; nevertheless, these forces are still there and only when a position $a$ is exceeded, then the device is in an astable position, as now element 8 will be moved into a different position of equilibrium. That position $a$ is reached when rack element 8 has moved from the equilibrium position by a distance equal to half the center to center distance of the poles of element 8. That distance is identifiable by the spacing between the points $b$ of equilibrium in FIG. 2. These points are, of course, periodically repeated due to the periodic repetition of poles of element 8 in the direction of movement and extension. The points $a$ of instability are located half way between the equilibrium points $b$.

It can thus be seen that a range of restoration to stabil conditions exists about each point $b$, which runs from a point $a$ on one side to the point $a$ on the other side. As long as a displacement of element 8 remains within that range, stabil positions will be restored by the system. If that range is exceeded then the element 8 will tend to home in on another equilibrium position, equivalent to a one step displacement. It follows on the other hand that an intentional displacement of element 8 can be obtained by providing energizing forces which push element 18 out of an equilibrium position, just beyond one of the points $a$ of instability. Aside from overcoming the magnetic restoration, the magnetic forces tending to change the disposition of element must not be too large, so that the inertia of element 8 and e.g. of a cipher roll actuated by it, will not move the element 8 beyond the next equilibrium position.

We now consider the dynamic conditions of changing the position of element 8 in greater detail. We assume that coil 6 is to be energized by current in a particular direction for obtaining a change in position of element 8 to the right. Such a displacement requires that the flux produced by coil 6 reduces the bias in pole-shoe 4 as resulting from the permanent magnet 1. Moreover, we assume that the current through coil 6 provides an energization level W. As the flux in pole shoe 4 is reduced, the flux in central pole shoe 3 is also reduced a little, while the flux in shoe 2 as originating from the permanent magnet is augmented, i.e. reinforced, because pole shoe 2 is in the return path for that flux from coil 6. Actually, for the static situation it is not too important how the overall energization Wi is being produced, because presently we consider the progression of element 8 from position to position on the basis of static conditions for obtaining and assuming such positions. The time element will have to be considered later which involves pulse and signal amplitude and duration.

Since the energization of coil 6 reinforces the bias in magnetic pole 2, that pole provides a strong attraction to the closest pole ($-a$) of element 8. This attraction is particularly stronger than the restoring force as between central pole 3 and pole O of element 8, as it may arise following a displacement between pole shoes O and 3, so that the movable element 8 is moved towards and into the position of FIG. 1a.

The particular position of element 8 in FIG. 1a is characterized by a current flow in coil 6, which reduces the effective flux (bias) in pole 4 to zero. In other words, the energization level W is assumed to be that level necessary to compensate completely the bias in pole 4. However, the flux in pole 3 is not compensated at that pont, while pole 2 provides for strong bias-reinforced attraction for pole $-a$.

If the current in coil 6 were increased further, to a value, in which the flux in pole 3 is compensated (energization level $W_2$), poles 2 and 4 are approximately similarly energized, because the bias is no longer effective. Such a flux distribution now causes the element 8 to be moved out of the position of FIG. 1a to the position of FIG. 1b in that the pole attracts (or, better, continues to attract) pole $-a$, while pole 4 attracts pole O of element 8. Please note that this would still be true, if for some reason element 8 had just barely moved out of the position of FIG. 1. This could happen if the element 8 is retarded for some reason and energization level W was merely sufficient to move element 8 a little out of the equilibrium position of FIG. 1! In other words, the energization level $W_2$ suffices, so that the position of FIG. 1b will be attained even if the element 8 has moved only a very little out of the equilibrium position of FIG. 1 ("equilibrium" for zero energization!).

The position of element 8 of FIG. 1b is significant, because it is the position $a$, which is astable, if there were no electromagnetic, bias offsetting magnetization. Presently, we assume that it is necessary to compensate the magnetic bias completely to move element 8 past that point, (inertia being, of course, neglected presently), because that is the prerequisite for causing the element 8 to move by one step which could also be defined as a movement from one equilibrium position to the next one without falling back into the original one.

Since the position of element 8 in FIG. 1b is actually equivalent to or near the position in which the element 8 passes the dividing line, position $a$ between two stable positions, the magnetization current through coil 6 should be reduced again. The attraction of pole O by pole 4 diminishes, but the attraction by pole 2 upon pole $-a$ continues. In addition, pole 3 attracts pole $-a$ also! Added to that must be the consideration of the motion of element 8 under its own inertia, so that the element will pass through the position shown in FIG. 1b towards the position of FIG. 1a. The energization level now may be assumed to be again $W_1$. The element 8 could actually be carried by its own inertia beyond the point of maximum attraction of pole $-a$ by stator pole 2.

As the magnetizing current and energization level drops to zero, one needs merely to consider that in the position of FIG. 1c element 8 has passed the point a in between two positions $b$ in which pole O and pole $-a$ are aligned with center pole 3. As the energization declines, the right hand stator pole 4 still exerts very little attraction upon pole O, but center pole 3 attracts strongly pole $-a$. The left hand stator pole 2 exerts a retarding effect on pole $-a$, but that retardation is smaller than the attraction of pole $-a$ by central stator pole 3. This is so, because on the one hand, almost the entire magnetic bias (permanent magnet 1 is concentrated in pole 3 and tends to attract the pole $-a$ still being somewhat to the left from pole 3. This flux concentration simply results from the fact that the effective air gap between poles $-a$ and 3 (rather than between poles 0 and 3) has minimum magnetic impedance. On the other hand, the magnetic circuit is closed predominantly via right hand stator pole 4; however, that pole does not provide any significant linear attraction to element 8 at first. Therefore, the rather small residual flux as passing through pole 2 provides little retarding attraction upon pole $-a$, simply because the main flux circuit and path involves predominantly pole 4 and not pole 2.

As a consequence, element 8 continues to be moved (actively and, of course, by virtue of its inertia) towards the position of FIG. 1d. Additionally, it should be mentioned that the retarding force of pole 2 decreases with further advance of element 8, while the attraction by pole 3 increases, because the effective air gap becomes smaller. Pole 4 does also provide for some retardation (of pole O), but the attractive force upon pole $-a$ by pole 3 increases so steeply to be dominating by far. Moreover, as pole $-b$ approaches pole 2, it is also being attracted which attraction is in the right direction as far as moving element 8 is concerned and that attraction is soon compensated by itself by the retardation of pole O through pole 4.

Finally, the element 8 arrives in the position depicted in FIG. 1d in which pole $-a$ is aligned with pole 3 and that is, of course, another equilibrium position for zero magnetization by and through coil 6. At that point the energizing current through that coil is zero and, as mentioned above, care must be taken that the element 8 does not overshoot too far by its own inertia beyond the next point $a$ of instability. The element 8 (and a cipher roll if connected thereto) has now been moved by one definite step and will stabilize in the new equilibrium position. Please note that the stabilization is dynamically reached in that upon diminishing energization the retardation of pole O by stator pole 4 increases.

Referring now again to FIG. 2, the position of FIG. 1b is critical as far as the timing of the reduction of the energization from $W_2$ to $W_1$ and W is concerned. Unfavorable conditions and parameters could conceivably create an astable situation. Therefore, the position of FIG. 1b must have been passed before the energization level is reduced again. It is conceivable otherwise that the element 8 is not moved by the desired step, but drops back into the position of FIG. 1.

Figure 4:
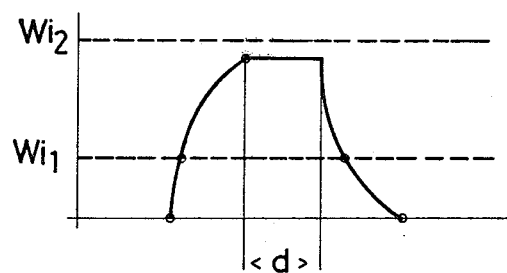
FIG. 4 is a diagram of a pulse shape as the preferred signal contour to be used in the motor.
Figure 5:
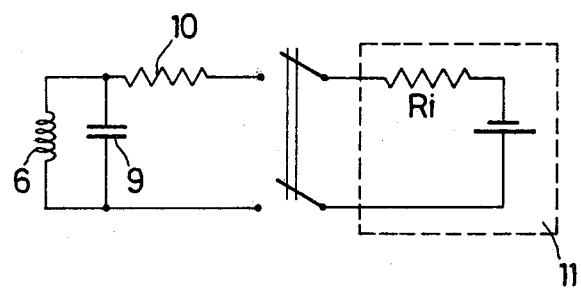
FIG. 5 is a circuit diagram for providing pulses of the type shown in FIG. 4.

The inertia of element 8 is not very large. Thus, the astable position (FIG. 1b) will be dynamically negotiated if the duration of strong energization by signal levels in excess of $W_1$, (i.e. from $W_1$ via e.g. $W_2$ back to $W_1$), is sufficiently long. A pulse as shown in FIG. 4 is preferred for energizing coil 6. Of course, the period marked d must not be too long, so that element 8 will not be propelled beyond the desired single step position! A pulse shape of FIG. 4 is actually a normal one. FIG. 5 is a schematic representation of an energizing circuit for coil 6. A voltage source 11 for d.c. may be provided, and it is presumed that a switch temporarily connects that source to coil 6. The duration being selected to be about equal to the time it takes the element 8 to move from an equilibrium position past the next instability point a. Matching of the energization inertia of element 8 (and any element driven by it) or vice versa is possible, particularly if one connects a capacitor 9 parallel to coil 6 (FIG. 5) and if the coil capacitor circuit is fed with current via a resistor 10. Actually, the internal resistance of the voltage supply source 11 may suffice.

Matching inertia and energization power permits operation with much less power than conventional electromagnetic counters. However, one does not have to optimize sensitivity in this respect, so that resistance 10 may have the added function of adjusting the amplitude of the signal (pulse) to the desired level. Alternatively, the resistor can be used to match similar coils to different supply voltages.

Passage across the instability position a (FIG. 1b) is insured further by the fact that the magnetic field resulting from energizing coil 6 at the level $W_2$ is supposed to compensate the field in pole 3 as provided by the permanent magnet 1. However, in reality this condition can be somewhat modified.

Figure 3:
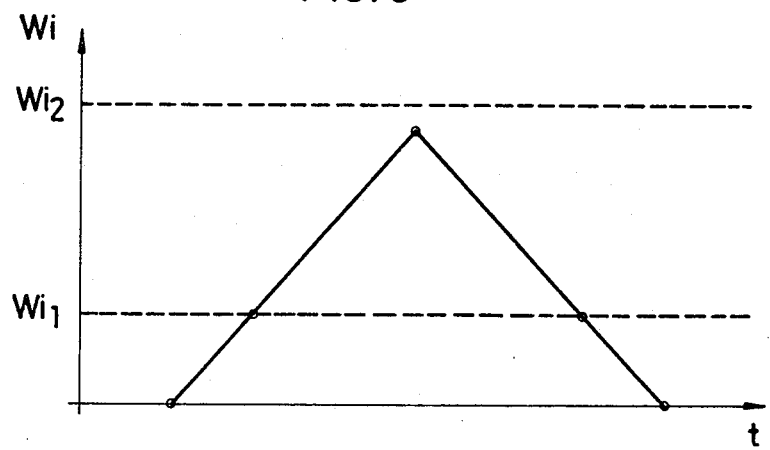
FIG. 3 is an energization level vs. time diagram.

Flux lines have always the tendency of closing along the path of least resistance. Therefore, the flux lines concentrate slightly in the right hand portion of pole 3, when element 8 moves out of the position of FIG. 1 towards the position of FIG. 1b. Hence, compensation of the permanent magnetic bias in pole 3 occurs slightly earlier! This is the reason that the energization levels as plotted in FIGS. 3 and 4 do not quite reach level $W_2$. Moreover, it was found that it is not critical whether or not one really has full compensation of the bias for peak energization! A smaller compensation is quite permissible as long as one does not overcompensate in the right hand portion of the pole 3. If that is avoided, then the flux in the left hand portion of pole 3 will be always larger (simply because the bias is compensated to a lesser degree). Optimum conditions are obtained when the bias is compensated to zero in the right hand portion of pole 3 alone.

As long as the flux is less strong here than in the left hand portion, operational stability is still ensured when the element 8 upon reaching the position of FIG. 1b experiences an attraction in which the not compensated bias of the left side of center pole 3 attracts pole —a while the compensated right hand portion of pole 3 does not attract (i.e. retard!) pole O. Thus, the simplifying assumption of symmetrical conditions in pole 3 is not really true, but the deviations are actually more favorable for proper operation. Energization level $W_2$ does not have to be reached at all and still one will be sure that the rack or rotor element 8 is pulled beyond the position of FIG. 1b.

We have explained the operation on the basis of energizing only coil 6 and for one step of movement of element 8. In view of the symmetry of the construction, it is readily apparent that upon like energization of coil 5 (only!), element 8 is moved by one step to the left from a position of equilibrium. Consequently, energizing coil 5 or coil 6 provides for left or right hand step motion of element 8 and if a digit or cipher roll is connected thereto, one can count in either direction.

The operation as described thus far involves energization of coils 5 and 6 in alternative modes. However, they could also be energized in unison in that the energization of one stator pole shoe weakens the bias from the permanent magnet in that pole shoe, while the bias is reinforced by the other coil and in the other pole shoe. The two coils can be serially interconnected to be energized by the same current pulse. For reverse counting, the polarity of the pulse is simply reversed.

The circuit should be matched, so that the current pulses for forward and reverse actuation (counting) have similar amplitude and duration, at least to the extent that concurring forward and reverse pulses compensate sufficiently and element 8 remains in the position it has. This is true for a two coil mode operation as well as for the earlier described one-coil-per-direction mode.

Figure 6:
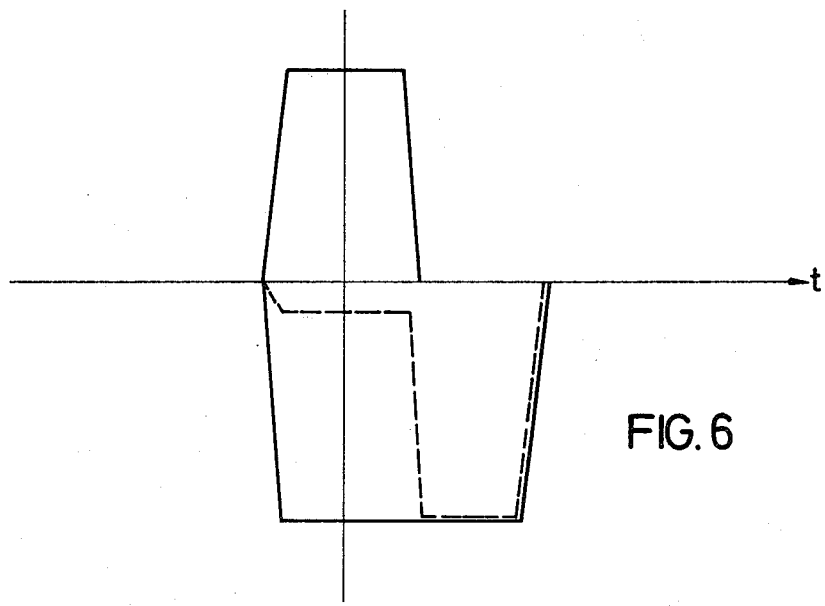
FIGS. 6, 7, and 8 represent pulse diagrams for conceivable error situation.
Figure 7:
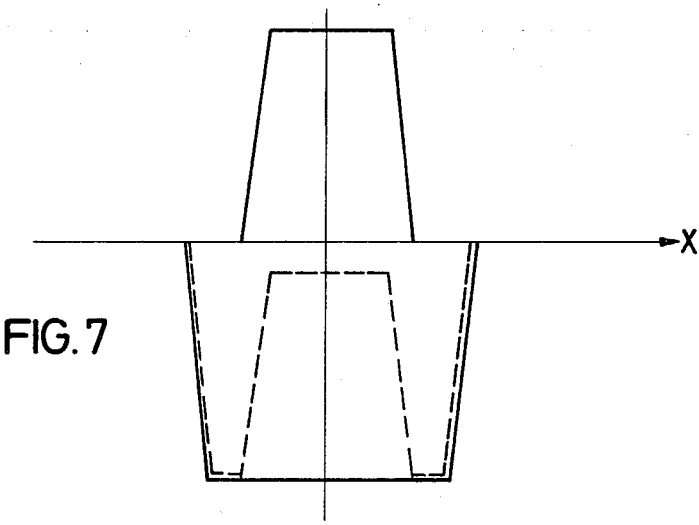

FIG. 6 shows an example for unequal durations of two oppositely directed, concurring counting pulses which could produce a counting error as shown in the dashed line. FIG. 7 shows an extreme case of incorrect operation, if the one pulse begins before and ends after the other pulse. This particular inequality in pulse duration may result in two incorrect counting steps (two dashed pulse contours) when actually none should be performed. Thus, electric matching of pulse durations is the more critical the lower the inertia of element 8 is.

Figure 8:
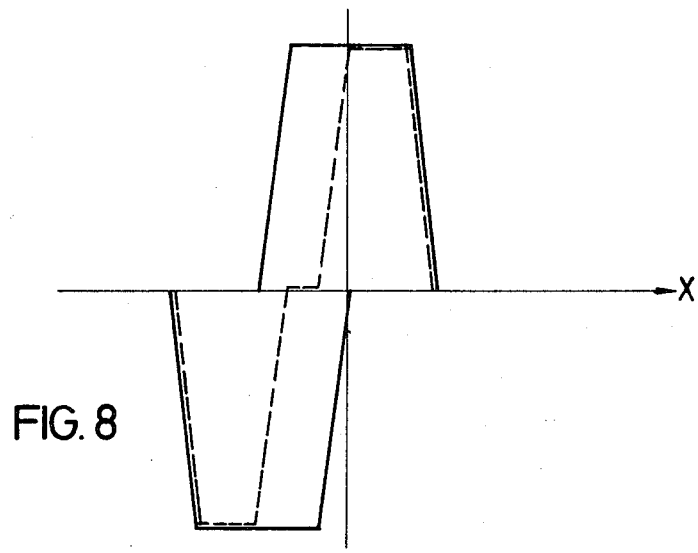

As long as the pulses have similar contour, counting will, indeed, proceed correctly. Even if pulses partially overlap, counting in one direction may be succeeded immediately by a step in the reverse, if the time integral of the residual, non-compensated pulses suffice to actuate the element 8 (FIG. 8). It can readily be seen that it is desirable to limit the pulses as to duration to avoid unbalanced situations for concurring or overlapping pulses. Moreover, the pulses should be long enough, so that the element 8 can safely follow the motion command, but the pulses must not be too long as the element should not experience excessive actuation!

Turning back for the moment to FIG. 1, certain operation for low power is enhanced by magnetic shunt paths (iron) 13 and 14 running parallel to the permanent magnet 1 and having air gaps 15 and 16. The gaps may actually be filled with a non-magnetic material. These shunt paths compensate the usually low magnetic conductivity of permanent magnets and the much higher conductivities of these two shunt paths are beneficial for obtaining better conductance in the return paths for the flux as produced by the coils 5 and 6. Consequently, a current pulse of given amplitude - duration produces a higher magnetization with shunt than without shunt, so that for similar effects a lesser amplitude or shorter duration may suffice.

This feature (shunts) is also beneficial for preventing demagnetization of magnet 1, if an energizing pulse happens to have excessive amplitude. Related thereto is the fact that the shunt paths are instrumental in stabilizing the operating points of the system. Adequately, powerful shunts will advoid shifting of the working points.

Figure 9:
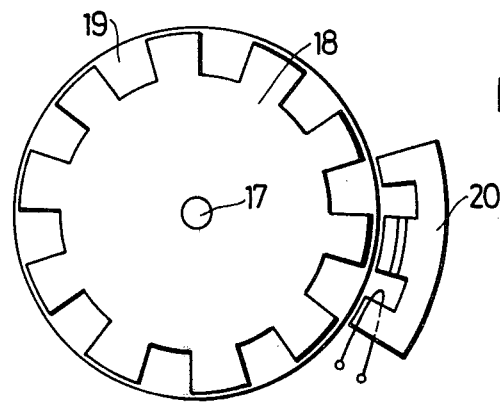
FIG. 9 is a schematic plan view of a motor incorporating the principles of the invention for driving a cipher roll in a counter.
Figure 10:
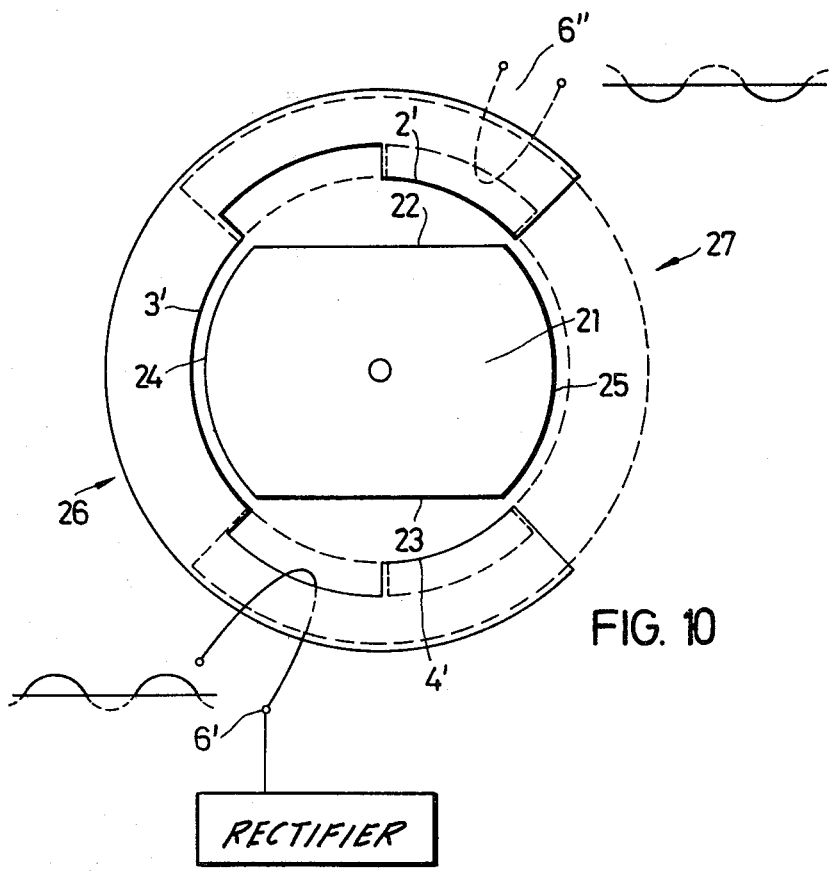
FIG. 10 is a schematic view of a synchronous motor also incorporating the principles of the invention.

Turning now to FIG. 9, there is a motor illustrated for moving a counter drum. The motor has a rotor 18 which will turn on an axis 17. Rotor 18 is the movable element for this case and is provided to move a cipher roll 19. The cipher roll is more or less an integral part of the rotor. The rotor cooperates with a curved E-stator 20. This arrangement works as described above in that the displacement of element 8 of FIG. 1 is now rotor 18.

FIG. 10 illustrates application of the inventive concept of a self-starting synchronous motor. The rotor 21 of this motor is basically a cylindrical body with two flattened portions 22 and 23. The cylindrical surfaces 24 and 25 constitute the pole shoes of the movable element.

The stator 26 of the motor shown in FIG. 10 is provided in that in the illustrated position a central stator pole 3' faces rotor pole 24. In addition, the stator has the two poles 2' and 4'; only one thereof is coupled to a stator coil, denoted here by 6'. The stator 26, therefore, has a configuration which one could term a three quarter wrap-around E. It can readily be seen that one of the rotor poles, e.g. 25 in illustrated position carries out the function of the two poles −a and +a in FIG. 1.

The stator system has a second stator 27, which is axially offsett and oriented (physically) 180° out of phase as compared with stator 26. Stator 27 is otherwise of similar configuration and shown in dotted lines. Specifically, the permanent-magnetically biased pole of that stator 27 is diagonally opposed (plus axial offset) to pole 3', and reference numeral 6" denotes the stator coil for this second stator, also being effective in a diagonally opposed disposition with regard to coil 6.

The two coils 6' and 6" are energized by spaced apart pulses resulting, for example, from separate one way rectification of an a.c. voltage. For example, coil 6' may receive the positive half waves of that a.c. supply and coil 6" receives the negative half waves. This may result in rotation of the rotor in clockwise direction, whereby both stators act on the rotor in the same sense. The rotor will start in the correct direction and both half waves of an a.c. supply voltage are used which is beneficial as far as power consumption is concerned.

The considerations made above and concerning dual energization are also applicable here. One could use a second coil on each stator whose energization reinforces the effect of the first coil. Also, one could include the second coil to cause the motor to rotate in the opposite direction.

The invention is not limited to the embodiments described above, but all changes and mofications thereof not constituting departures from the spirit and scope of the invention are intended to be included.

I claim:
1. Electromagnetic motor comprising:
   a stator having three pole shoes, one of which being permanently magnetically biased and a divided magnetic return flux runs through the two other pole shoes;
   a movable element having at least two pole shoes of similar width and being magnetically interconnected to complete separate paths for said divided magnetic flux, the two poles of the movable element being spaced differently than the said three pole shoes are spaced from each other, so that in a symmetrical position of one of the shoes of the element relative to a central one of said stator pole shoes, another of the pole shoes of the element is asymmetrically positioned to each of the other two stator pole shoes, whereby a stable neutral position for the element is defined by a position of any of the pole shoes of the element opposite the biased stator pole shoe, while at least one respective other pole shoe of the movable element returns said divided flux to said two other pole shoes, so that the movable element experiences oppositely directed, balanced driving forces; and
   coil means including a coil on or in magnetically coupled relation with one of said other stator pole shoes to provide a flux thereto to modify said forces towards imbalance, so that the element is moved by a distance at least half a spacing between two of the poles of the movable element and towards a position in which the other one of the poles of the elements faces said biased pole shoe.

2. Motor as in claim 1, wherein the biased pole shoe includes a permanent magnet.

3. Motor as in claim 2 and including at least one magnetic shunt path not included in any flux path through the movable element.

4. Motor as in claim 1, wherein the biased pole shoe is centrally located between the other two.

5. Motor as in claim 4, wherein the stator is of E-shaped configuration.

6. Motor as in claim 5, wherein the width of the central pole shoe in direction of movement of the movable element is about the same as a corresponding width of the poles of the movable element, the other two poles shoes having about half that width and the edge to edge spacing to the central pole shoes is also about half that width.

7. Motor as in claim 1, wherein each of the other two pole shoes are coupled to energizing coils, including the coil on the one other pole shoe.

8. Motor as in claim 7, wherein said coils are electrically connected in series.

9. Motor as in claim 1, wherein said movable element is a rotor, the pole shoes having cylindrically curved surfaces.

10. Motor as in claim 9, wherein the rotor is a flattened cylindrical body.

11. Motor as in claim 10, said stator being one of two similarly constructed stators, which are axially offset and whose configuration has a 180° degree phase displacement, each of the stators having at least one coil.

12. Motor as in claim 1 and including means for providing pulses to the coil having duration and amplitude for accelerating the movable element by at least one half a pole center to pole center spacing of the movable element.

13. Motor as in claim 12, wherein the means include a capacitor connected in parallel to said coil.

14. Motor as in claim 13 and including a resistor serially connected to said coil and to said capacitor.

15. Motor as in claim 12, wherein the means includes a rectifier to provide one way rectified pulses to the coil.

16. Motor as in claim 12, wherein the means includes a pulse shaper.

17. Motor as in claim 1, wherein the stator poles are spaced less than the poles of the movable element.

18. Motor as in claim 1, wherein the movable element is or is part of a cipher roll.

19. An electromagnetic stepping motor, comprising:
a rotor having a plurality of similarly wide and equidistantly spaced salient poles; each pole having particular width and the spacing between the poles having particular width; a stator being of E-shaped configuration with a permanently biased center pole, having a width corresponding to the width of the rotor poles, and having two outer poles spaced from the center pole at a spacing smaller than the width of the spacing between the rotor poles, and the outer poles having width smaller than the width of the center pole; and
coil means on the stator for asymmetrically modifying the bias in the two outer poles.

20. A motor as in claim 19, wherein said width of the outer poles and the edge-to-edge spacing between them and the center pole together are about equal to an edge-to-edge spacing of the rotor poles.

* * * * *